(12) United States Patent
Chen et al.

(10) Patent No.: US 11,777,665 B2
(45) Date of Patent: Oct. 3, 2023

(54) INFORMATION PROCESSING METHOD, COMMUNICATION DEVICE AND STORAGE MEDIUM

(71) Applicant: ZTE Corporation, Guangdong (CN)

(72) Inventors: Yijian Chen, Guangdong (CN); Zhaohua Lu, Guangdong (CN); Yu Ngok Li, Guangdong (CN); Hao Wu, Guangdong (CN); Bo Gao, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 16/796,704

(22) Filed: Feb. 20, 2020

(65) Prior Publication Data
US 2020/0336256 A1 Oct. 22, 2020

Related U.S. Application Data

(63) Continuation of application No. PCT/CN2018/106937, filed on Sep. 21, 2018.

(30) Foreign Application Priority Data

Nov. 17, 2017 (CN) .......................... 201711146781.5

(51) Int. Cl.
*H04B 7/0413* (2017.01)
*H04L 5/00* (2006.01)
(Continued)

(52) U.S. Cl.
CPC ......... *H04L 1/1845* (2013.01); *H04B 7/0413* (2013.01); *H04L 5/0051* (2013.01); *H04W 72/046* (2013.01); *H04W 76/27* (2018.02)

(58) Field of Classification Search
None
See application file for complete search history.

(56) References Cited

U.S. PATENT DOCUMENTS 9,516,632 B2 12/2016 Lee et al.
10,834,716 B2 * 11/2020 Park ..................... H04W 72/23
(Continued)

FOREIGN PATENT DOCUMENTS

| CN | 103795513 A | 5/2014 |
|---|---|---|
| CN | 105636105 A | 6/2016 |

(Continued)

OTHER PUBLICATIONS

CATT, "Beam management for control and data channel," 3GPP TSG RAN WG1 Meeting #88, Athens, Greece, R1-1702076, 4 pages, Feb. 13, 2017.

(Continued)

*Primary Examiner* — Jeffrey M Rutkowski
*Assistant Examiner* — Luna Weissberger
(74) *Attorney, Agent, or Firm* — Perkins Coie LLP (57) ABSTRACT

Provided are an information processing method, a communication device and a storage medium. The information processing method which is applied to a first communication device includes: sending X sets of parameter values jointly encoding M types of transmission parameters, where the M types of transmission parameters include a beam indication and/or a quasi-co-location indication parameter, where the beam indication is used for indicating a beam, the quasi-co-location indication parameter is used for indicating a parameter of the beam, and M>1; selecting Y sets of parameter values from the X sets of parameter values, where X>=Y>=1; and sending a selection indication based on the Y sets of parameter values, where the selection indication is (Continued)

Beam indication/QCL indication, transmission parameter 1, transmission parameter 2 ... and transmission parameter N

↓

Joint configuration
signaling RRC/MAC/DCI used for selecting the Y sets of parameter values from the X sets of parameter values for a data transmission.

12 Claims, 4 Drawing Sheets

(51) Int. Cl.
*H04W 72/02* (2009.01)
*H04W 76/27* (2018.01)
*H04L 1/1829* (2023.01)
*H04W 72/044* (2023.01)

(56) References Cited

U.S. PATENT DOCUMENTS

| | | | | |
|---|---|---|---|---|
| 2015/0230220 | A1* | 8/2015 | Li | H04W 72/23 370/329 |
| 2017/0288743 | A1* | 10/2017 | Nam | H04B 7/0626 |
| 2020/0045689 | A1* | 2/2020 | Baldemair | H04W 72/0453 |
| 2020/0389220 | A1* | 12/2020 | Kang | H04W 74/0833 |
| 2021/0135922 | A1* | 5/2021 | Gao | H04B 7/005 |

FOREIGN PATENT DOCUMENTS

| | | | |
|---|---|---|---|
| CN | 106559879 | A | 4/2017 |
| CN | 108112080 | A | 6/2018 |
| EP | 2892169 | A2 | 7/2015 |
| EP | 2942888 | A1 | 11/2015 |
| WO | 2017/023231 | A1 | 2/2017 |
| WO | 2017/050033 | A1 | 3/2017 |
| WO | 2017/134624 | A1 | 8/2017 |
| WO | 2017/185983 | A1 | 11/2017 |
| WO | 2017/193831 | A1 | 11/2017 |

OTHER PUBLICATIONS

Chinese Office Action dated Dec. 18, 2020 for Chinese Patent Application No. 201711146781.5, filed on Nov. 17, 2017 (12 pages).
Chinese Office Action dated Jul. 9, 2020 for Chinese Patent Application No. 201711146781.5, filed on Nov. 17, 2017 (12 pages).
Extended Search Report dated Oct. 12, 2020 for European Patent Application No. 18879723.7 filed on Sep. 21, 2018 (10 pages).
Samsung, "Discussion on transmission parameter sets," 3GPP TSG RAN WG1 NR Ad-Hoc#2, Qingdao, P.R. China, R1-1710650, 3 pages, Jun. 27, 2017.
Samsung, "Remaining details on QCL," 3GPP TSG RAN WG1#90b, Prague, Czech Republic, R1-1717634, 9 pages, Oct. 9, 2017.
ZTE et al., "Beam related indication for DL and UL beam management," 3GPP TSG RAN WG1 NR Ad-Hoc Meeting, Spokane, Washington, USA, R1-1700123, 7 pages, Jan. 16, 2017.
International Search Report and Written Opinion dated Nov. 29, 2018 for International Application No. PCT/CN2018/106937, filed on Sep. 21, 2018 (11 pages).
Indian Office Action dated Jun. 18, 2021 for Indian Patent Application No. 202047024801, filed on Sep. 21, 2018 (5 pages).
Japanese Office Action dated Aug. 17, 2021 for Japanese Patent Application No. 2020-527080, filed on Sep. 21, 2018 (9 pages).
ZTE et al., "On transmission setting," 3GPP TSG RAN WG1 Meeting #90bis, Prague, Czechia, R1-1717421, 4 pages, Oct. 9-13, 2017.
Notification to Grant Patent Right for Invention dated Mar. 17, 2021 for Chinese Patent Application No. 201711146781.5, filed on Nov. 17, 2017 (2 pages).
Korean Office Action dated Oct. 7, 2021 for Korean Patent Application No. 10-2020-7016536, filed on Sep. 21, 2018 (6 pages).
Nokia et al., "Summary of QCL," 3GPP TSG-RAN WG1 Meeting #90bis, Prague, Czech Republic, R1-1718863, 21 pages, Oct. 9-13, 2017.
Korean Office Action dated Jan. 13, 2022 for Korean Patent Application No. 10-2020-7016536 (6 pages).
Ericsson, "Text Proposal for L1 parametrs for 38.331," 3GPP TSG RAN WG2 #99bis, Prague, Czech Republic, Tdoc R2-1711969, 26 pages, Oct. 9-13, 2017.
Japanese Decision of Patent dated Mar. 15, 2022 for Japanese Patent Application No. 2020-527080, (5 pages).
ZTE: "QCL/QCB design for NR MIMO", 3GPP Draft; R1-1707134 QCL QCB Design for NR, 3rd Generation Partnership Project (3GPP), Mobile Competence Centre ; 650, Route Des Lucioles ; F-06921 Sophia-Antipolis Cedex; France, vol. RAN WG1, No. Hangzhou; May 15, 2017-May 19, 2017 May 8, 2017 (May 8, 2017), XP051263431, Retrieved from the Internet: URL: http://www.3gpp.org/ftp/ tsg_ran/WG1_RL 1/TSGR1_89/Docs/[retrieved on May 8, 2017].
ZTE et al., R1-1717433, Remaining details on DL DMRS and UL DMRS, 3GPP TSG RAN WG1 #90bis.
European Communication Pursuant to Article 94(3) EPC dated Jul. 8, 2022 for Application No. 18879723.7, 7 pages.
Korean Office Action dated Aug. 18, 2022 for Application No. 10-2020-7016536, 2 pages.
Ericsson, "Open issues on RRC parameters for Reference signals and QCL," 3GPP TSG RAN WG1 #90bis, Prague, Czech Republic, R1-1718683, Oct. 9-13, 2017, 6 pages.
Samsung, "On Beam Indication," 3GPP TSG RAN WG1 #90bis, Prague, Czech Republic, R1-1717627, Oct. 9-13, 2017, 9 pages.
Korean Office Action dated Feb. 2, 2023 for Korean Application No. 10-2020-7016536, 10 pages.
The Spreadtrum Communications, R1-1717745, remaining issues on DMRS for CP-OFDM, 3GPP TSG RAN WG1 #90bis, 3GPP server publication date (Oct. 2, 2017), 10 pages.
Notification of the Second Office Action for Chinese Application No. 2021106047800 dated Feb. 23, 2023, 4 pages.
CNIPA, Third Office Action for Chinese Application No. 202110604780.0, dated May 18, 2023, 5 pages with unofficial translation.

* cited by examiner

INFORMATION PROCESSING METHOD, COMMUNICATION DEVICE AND STORAGE MEDIUM

CROSS REFERENCE TO RELATED APPLICATIONS

This patent document is a continuation of and claims the benefit of priority of International Patent Application No. PCT/CN2018/106937, filed on Sep. 21, 2018, which claims the benefit of priority of Chinese Patent Application No. 201711146781.5, filed on Nov. 17, 2017. The entire contents of the before-mentioned patent applications are incorporated by reference as part of the disclosure of this application.

TECHNICAL FIELD

The present disclosure relates to the field of communications and, in particular, to an information processing method, a communication device and a storage medium.

BACKGROUND

The transmission parameters can be used as parameters for communication between two parties. For example, the transmission parameters include a resource parameter of communication resources used by the two parties, an indication of a modulation and coding scheme used by the two parties, an indication of whether to receive or send a reference signal, a retransmission parameter for controlling the retransmission, and the like.

Generally, the transmission parameters are transmitted by physical layer signaling or higher layer signaling. For example, the higher layer signaling may include: Radio Resource Control (RRC for short) signaling and/or Media Access Control (MAC for short) signaling.

In the related art, it is found that in some cases, the communication quality still fails to achieve a desired effect when the two parties communicate with each other based on the interactive transmission parameters.

SUMMARY

In view of the above, embodiments of the present disclosure provide an information processing method, a communication device and a storage medium to at least partially solve the above problem of poor communication quality.

To achieve the above object, technical solutions of embodiments of the present disclosure are implemented as follows.

In a first aspect, an embodiment of the present disclosure provides an information processing method which is applied to a first communication device. The method includes: sending X sets of parameter values jointly encoding M types of transmission parameters, wherein the M types of transmission parameters comprise: a beam indication and/or a quasi-co-location indication parameter, wherein the beam indication is used for indicating a beam, the quasi-co-location indication parameter is used for indicating a parameter of the beam, and M>1; selecting Y sets of parameter values from the X sets of parameter values, wherein X>=Y>=1; and sending a selection indication based on the Y sets of parameter values, wherein the selection indication is used for selecting the Y sets of parameter values from the X sets of parameter values for a data transmission In a second aspect, an embodiment of the present disclosure provides an information processing method which is applied to a second communication device. The method includes: receiving X sets of parameter values jointly encoding the M types of transmission parameters, wherein the M types of transmission parameters comprise: a beam indication and/or a quasi-co-location indication parameter, wherein the beam indication is used for indicating a beam, the quasi-co-location indication parameter is used for indicating a parameter of the beam, and M>1; receiving a selection indication; and selecting Y sets of parameter values from the X sets of parameter values for a data transmission according to the selection indication, wherein X>=Y>=1.

In a third aspect, an embodiment of the present disclosure provides a communication device which is a first communication device. The communication device includes: a first sending unit, which is configured to send X sets of parameter values jointly encoding M types of transmission parameters, wherein the M types of transmission parameters comprise: a beam indication and/or a quasi-co-location indication parameter, wherein the beam indication is used for indicating a beam, the QCL indication parameter is used for indicating a parameter of the beam, and M>1; and a first selection unit, which is configured to select Y sets of parameter values from the X sets of parameter values, wherein X>=Y>=1; where the first sending unit is further configured to send a selection indication based on the Y sets of parameter values to a second communication device, wherein the selection indication is used for selecting, by the second communication device, the Y sets of parameter values from the X sets of parameter values for a data transmission.

In the fourth aspect, an embodiment of the present disclosure provides a communication device which is a second communication device. The communication device includes: a second receiving unit, which is configured to receive X sets of parameter values jointly encoding M types of transmission parameters and a selection indication transmitted by the first communication device, wherein the M types of transmission parameters comprise: a beam indication and/or a quasi-co-location indication parameter, where the beam indication is used for indicating a beam, the quasi-co-location indication parameter is used for indicating a parameter of the beam, and M>1; and a second selection unit, which is configured to select Y sets of parameter values from the X sets of parameter values for a data transmission according to the selection indication, where X>=Y>=1.

In a fifth aspect, an embodiment of the present disclosure provides a communication device. The communication device includes: an antenna, which is configured to receive and send a radio signal; a memory, which is configured to store information; and a processor respectively connected to the antenna and the memory, which is configured to implement the information processing method provided by at least one of technical solutions described above by executing computer program stored in the memory.

In a sixth aspect, an embodiment of the present disclosure provides a computer storage medium, which is configured to store computer programs for implementing the information processing method provided by at least one of technical solutions described above after the computer programs are executed.

The information processing method, the communication device and the storage medium provided by the present disclosure send X sets of parameter values to a second communication device in advance, and notify, via the selection indication, changes of the transmission parameters of the second communication device when performing a beam switching. In such way, the transmission parameters can be switched based on the beam switching, thereby ensuring the data transmission between the parties.

DETAILED DESCRIPTION

Technical solutions of the present disclosure will be further described in detail with reference to the accompanying drawings and embodiments.

Figure 1:
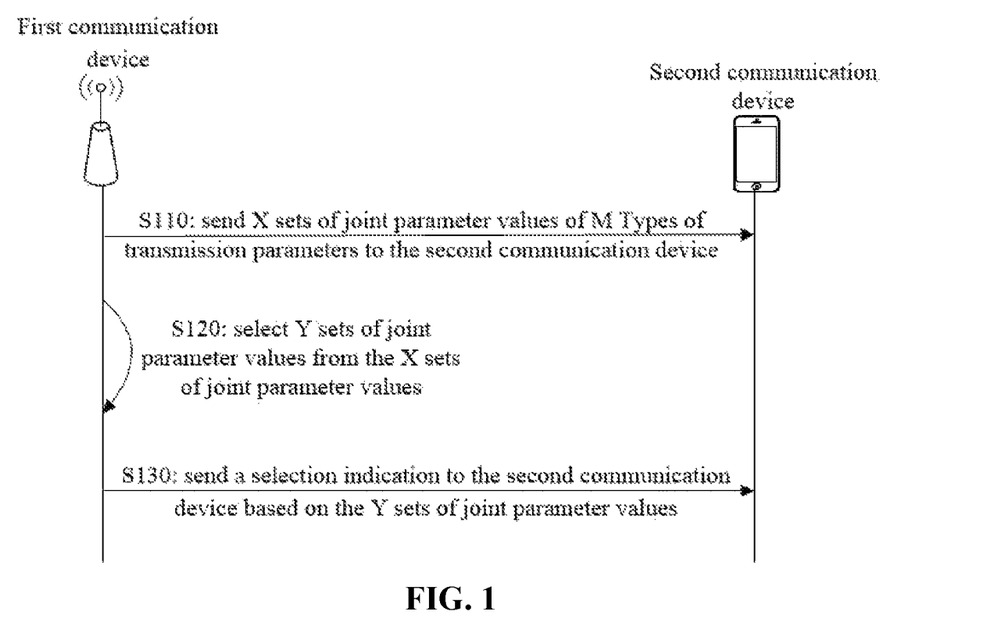
FIG. 1 is a schematic flowchart of a first information processing method according to an embodiment of the present disclosure.

As shown in FIG. 1, an embodiment of the present disclosure provides an information processing method which is applied to a first communication device. The method includes:

Step S110: X sets of parameter values jointly encoding M types of transmission parameters are sent to a second communication device, where the M types of transmission parameters include a beam indication and/or a quasi-co-location (QCL for short) indication parameter, where the beam indication is used for indicating a beam, the QCL indication parameter is used for indicating a parameter of the beam, and M>1.

Step S120: Y sets of parameter values are selected from the X sets of parameter values, where X>=Y>=1.

Step S130: a selection indication is sent to the second communication device based on the Y sets of parameter values, where the selection indication is used for selecting, by the second communication device, the Y sets of parameter values from the X sets of parameter values for data transmission.

In this embodiment, the first communication device and the second communication device are two parties which can communicate with each other. For example, the first communication device may be a base station, a relay node or another communication device, and the second first communication device may be one of various types of terminals.

The base station may include: an evolved NodeB (eNB), a next generation NodeB (gNB), a home base station, a macro base station or a small base station. The relay node may be a wireless node for the relay transmission, for example, a terminal or a wireless signal amplifier.

The terminal may include: a human-mounted terminal, such as a smart phone, a tablet and a wearable device; a vehicle-mounted terminal carried in a car or other vehicles; or an Internet of Things terminal. The typical Internet of Things terminal may include: a smart home and/or a smart appliance, such as an smart water meter, an smart electric meter and the like.

In this embodiment, the first communication device sends the X sets of parameter values jointly encoding the M types of transmission parameters to the second communication device. The M types of transmission parameters are parameters related to beams for the data transmission. In this embodiment, the M types of transmission parameters may be configured and transmitted to the second communication device together. The M types of transmission parameters are parameters related to beams. That is, when the beam switching is performed, transmission parameters to which the switched beam corresponds needs to be changed so as to ensure the transmission quality and the communication quality.

The X sets of parameter values include X sets of values jointly encoding the M types of transmission parameters. In step S110, the X sets of parameter values may be sent through the higher layer signaling, such as RRC signaling and/or MAC signaling. In other embodiments, the X sets of parameter values may be sent through the physical layer signaling. For example, part of parameter values in the X sets of parameter values is sent through downlink control information (DCI for short).

In step S120, Y sets of parameter values are selected from the X sets of parameter values. In one embodiment, the method further includes:

obtaining channel state information for communicating with the second communication device and/or measurement information of a specified reference signal. The measurement information reflects which beams are used by the first communication device and the second communication device to communicate with each other so as to obtain better communication quality. For example, the second communication device feeds back measurement information of each beam to the first communication device; and the first communication device selects one or more of beams to communicate with the second communication device according to the measurement information. For example, the first communication device selects several beams with the best communication quality as currently used beams or alternative beams. According to a correspondence between the current used beams and the X sets of parameter values, Y sets of parameter values are selected from the X sets of parameter values, where the Y sets of parameter values correspond to the currently used beams or alternative beams. The value of Y may be 1, 2, 3 or other values. For some states with multiple connections, the value of Y may be greater than or equal to 2.

In some embodiments, when it is determined that Y sets of parameter values are selected, the Y sets of parameter values are used to communicate with the second communication device so as to ensure the communication quality. In this embodiment of the present disclosure, beams to which the Y sets of parameter values correspond are used to perform the data transmission.

For example, before and after the beams used by the two parties for communication are switched, some changes may occur: changes in the beam width, changes in the beam direction, changes in the beam transmitting panel and changes in the beam transmitting node, and these changes may correspondingly change the optimum transmission parameters for obtaining better communication quality.

Changes in the transmitting beam, including the change in the beam width, the changes in the beam direction, the changes in the beam transmitting panel and the changes in the beam transmitting node, may change channel characteristics of the beam transmission. For example, the channel characteristics of the beam transmission may include one or more of the following: the multipath number, the multipath direction, the multipath-time delay, the multipath power. Due to changes in the channel characteristics, the following parameters may require to be changed: a precoding resource bundling granularity of a physical resource block (PRB), demodulation reference signal (DMRS) configuration, an uplink sub-band size (UL SB size) and/or tracking reference signal (TRS) configuration.

Changes in the beam transmitting panel and the beam transmitting node may cause changes in the crystal oscillator, which may cause the change in the phase noise. Therefore, a Phase Tracking Reference Signal (PTRS) configuration and the TRS configuration need to be changed correspondingly.

Changes in the beam width, changes in the beam direction, changes in the beam transmitting panel and changes in the beam transmitting node may cause changes in the transmitting antenna configuration and channel rank, which may affect the configuration of the max transmission layer number.

For the uplink transmission, changes in the transmitting beam, including changes in the beam width, changes in the beam direction and changes in the beam transmitting panel, may cause changes in the channel characteristics, which may cause the change in the optimum codebook subset.

Changes in the beam width, changes in the beam transmitting panel, changes in the beam transmitting node, changes in the beam gain, changes in the beam path loss and changes in the beam interference variation may cause changes in the signal to interference noise ratio (SINR) interval, which may affect the distribution of the modulation and coding scheme (MCS).

In addition, the changes in the beam transmitting node may also cause a reconfiguration requirement of a hybrid automatic retransmission request (HARQ) parameter, a resource allocation (RA) parameter, a bandwidth part (BWP) parameter and a random access response (RAR) parameter.

In the HARQ parameter, the number of coding block groups (CBG) is mainly affected and the number of coding block groups (CBG) suitable to different beam transmitting nodes is different.

The RA parameter is a resource allocation parameter and mainly includes the resource allocation type, minimum unit of the resource allocation and other parameters. Different transmission nodes may have different optimum RA parameters.

The BWP parameter indicates the bandwidth part, and different transmission nodes may have different bandwidths and different BWP partition.

Figure 3:
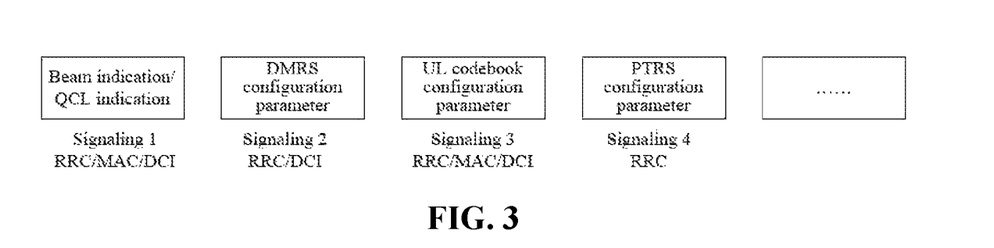
FIG. 3 is a transmission method of one type of transmission parameters.
Figure 4:
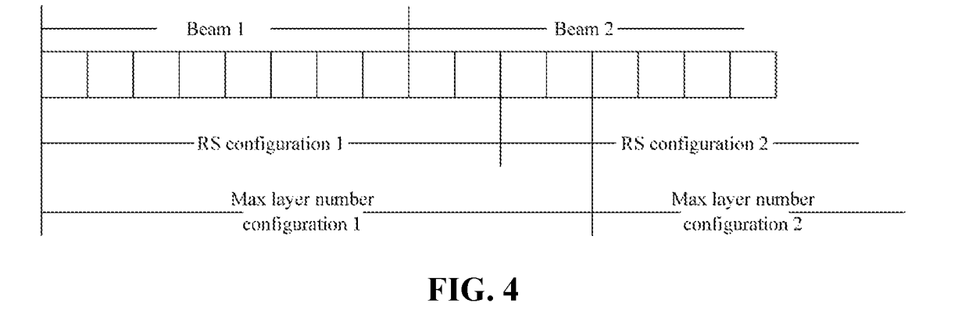
FIG. 4 is a schematic diagram of a beam switching and a transmission parameter switching.
Figure 5:
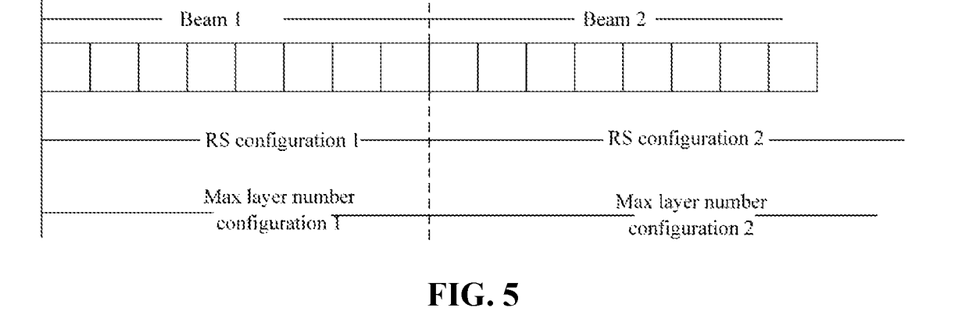
FIG. 5 is a schematic diagram of a beam switching and a transmission parameter switching according to an embodiment of the present disclosure.

FIG. 3 is a schematic diagram illustrating the transmission of different transmission parameters by using different signalings. For example, a beam indication or a QCL indication is transmitted by using the signaling 1 which may be RRC signaling, MAC signaling or DCI signaling. A DMRS configuration parameter is transmitted by using RRC or DCI signaling. The uplink codebook configuration parameter and the like are transmitted by using the signaling 3 which may be the RRC signaling, MAC signaling or DCI signaling. The PTRS configuration parameter and the like are transmitted by using the signaling 4 which may be the RRC signaling. The transmission effect is shown in FIG. 4 when different transmission parameters are sent separately by using different signalings. The beam switching may be quickly sent by using the physical layer signaling. However, the RS configuration parameter and the max layer number configuration parameter, sent by using the high layer signaling, are just switched after the beams between the two parties have been switched from the beam 1 to the beam 2 for a long time. Consequently, the switching of the transmission parameters lag behind the beam switching rate, thereby causing the poor transmission effect. A transmission effect is shown in FIG. 5 when the method provided by this embodiment is used. Since X sets of parameter values are sent to the second communication device in this embodiment, for example, a base station may send parameter value sets through the higher layer signaling to a terminal in advance, the switching of the transmission parameters is implemented by just sending the selection indication of one or more bits when the beam switching occurs. As a result, the switching of the transmission parameters may keep up with the speed of the beam switching, so that the communication quality is not reduced by the mismatch between the beam and the used transmission parameters.

In this embodiment, the selection indication may be information transmitted through the physical layer signaling. For example, the base station sends the selection indication via the DCI. The selection indication may be an index of the Y sets of parameter values. At the same time, in this embodiment, the X sets of parameter values sent at one time may be used repeatedly, so that the problem of large signaling overhead caused by repeatedly sending transmission parameters is reduced compared with the prior art. Therefore, the method has a characteristic of small signaling overhead.

Figure 2:
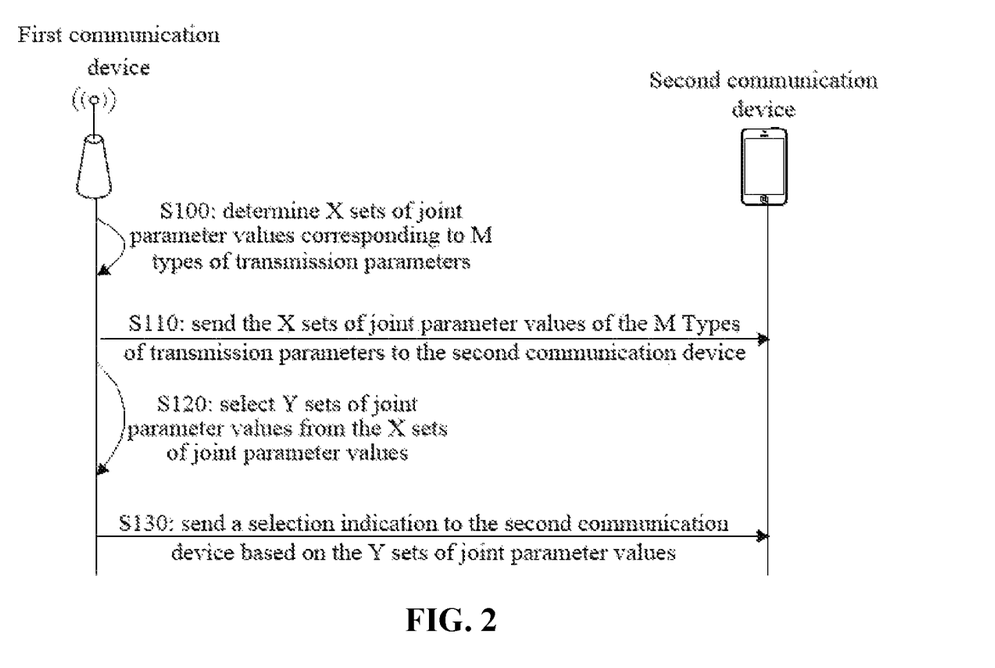
FIG. 2 is a schematic flowchart of a second information processing method according to an embodiment of the present disclosure.

In some embodiments, before sending the X sets of parameter values, as shown in FIG. 2, the method further includes:

Step S100, the X sets of parameter values to which the M types of transmission parameters correspond are determined.

For example, the X sets of parameter values are selected and sent to the second communication device according to measurement information sent by the second communication device. For example, the measurement information includes the geographical location of a terminal in a cell, a reference signal and/or pilot signal sent by the base station in the beam and received by the terminal at the geographical location, and the like. The terminal measures the signal strength and/or received power of these signals and sends the measurement information to the first communication device.

The M types of transmission parameters further include one or more types of the following transmission parameters: a multiple-input and multiple-output (MIMO) transmission parameter and a reference signal (RS) parameter. The MIMO transmission parameter may be a parameter related to an MIMO transmission. The RS parameter may be a parameter related to the transmission and reception of various reference signals.

In an exemplary embodiment, the MIMO transmission parameter includes one or more types of the following transmission parameters: a max layer number, a codebook subset (CSR), a codebook (CB) parameter, an uplink subband size, and a precoding resource bundling granularity (Bundling size).

The max layer number is used for indicating the maximum number of MIMO transmission data streams, for example, indicating the maximum number of data streams transmitted simultaneously in the space where the two parties are located.

The CB parameter is used for configuring the codebook.

The codebook subset (CSR) is used for defining a codeword in the codebook and controlling the codebook subset selected from the codebook for the coding.

The uplink resource block size (UL SB size) is used for defining a size of the resource block for an uplink transmission.

The precoding resource bundling granularity is used for defining a resource granularity using the same precoding mode. That is, the data transmission precoding in the corresponding granularity resource is the same.

In an exemplary embodiment, the RS parameter further includes one or more types of the following transmission parameters: a DMRS configuration parameter, a PTRS transmission indication and a tracking reference signal (TRS) configuration parameter.

In some embodiments, the DMRS configuration parameter may be a parameter related to a DMRS transmission, including frequency domain transmitting interval and/or time domain transmitting interval of the DMRS. The DMRS configuration parameter may further include: transmission resources used for the DMRS transmission, where the transmission resources include: frequency domain resources, time domain resources and/or code domain resources.

The PTRS transmission indication is at least used for indicating whether to transmit the PTRS. For example, in X sets of parameter values jointly encoding the M types of transmission parameters, 1 bit may represent the PTRS transmission indication. When the value of the 1 bit is a first value, the PTRS transmission indication indicates to transmit the PTRS, and when the value of the 1 bit is a second value, the PTRS transmission indication indicates not to transmit the PTRS. The first value is not equal to the second value. For example, if the first value is 0, the second value is 1; while if the second value is 0, the first value is 1.

In this embodiment, the PTRS transmission may be used for estimating a local oscillator of an oscillator.

The TRS parameter may be used for indicating information related to the transmission of the TRS, and for example, may include: a resource location and/or a transmission density used by the TRS transmission and other related parameters.

In some embodiments, the transmission parameters further include one or more types of the following parameters: a retransmission parameter, a resource allocation parameter, a bandwidth part (BWP) parameter and a modulation and coding scheme parameter.

The retransmission parameter may be used for indicating information related to the data retransmission, and for example, may include: a hybrid automatic retransmission request (HARM) parameter, an auto retransmission request (ARQ) parameter, or other parameter related to the retransmission.

The resource allocation parameter is used for indicating resource allocation state information, for example the resource allocation parameter includes an uplink resource allocation parameter and a downlink resource allocation parameter. The second communication device may learn at which resource location the data is sent or received, or at which resource location competes with other communication devices for resources according to the resource allocation parameter.

The modulation and coding scheme (MCS) parameter may include one or more MCS tables which are suitable for the beams which use the MCS after the beam switching.

In some exemplary embodiments, the step S100 may include: determining the X sets of parameter values to which a pilot resource location reported by the second communication device corresponds.

In an exemplary embodiment, the method further includes:

Step S121, an acknowledgment message sent by the second communication device based on the selection indication is received;

Step S121 may include: performing the data transmission with the second communication device according to the Y sets of parameter values after the acknowledgment message is received. The data transmission is performed by using a beam to which the Y sets of parameter values correspond. Beam identities and beam parameters of different beams are different. The beam identity may be a sequence code or name of the beam. The beam parameters may include a beam bandwidth, a beam direction and a beam transmitting node.

In some embodiments, only after the acknowledgment message sent by the second communication device is received, the first communication device communicates with the second communication device by using the Y sets of parameter values, thereby avoiding the problem in which the second communication device fails to receive information of the first communication device when the second communication device fails to receive the selection indication and the first communication device uses the Y sets of parameter values to communicate and the problem in which the first communication device fails to receive the data sent by the second communication device when the first communication device has already performed the beam switching by using old transmission parameters to transmit the data.

In other embodiments, before the acknowledgment message is not received, the first communication device uses the currently used transmission parameter to transmit data with the second communication device.

Figure 6:
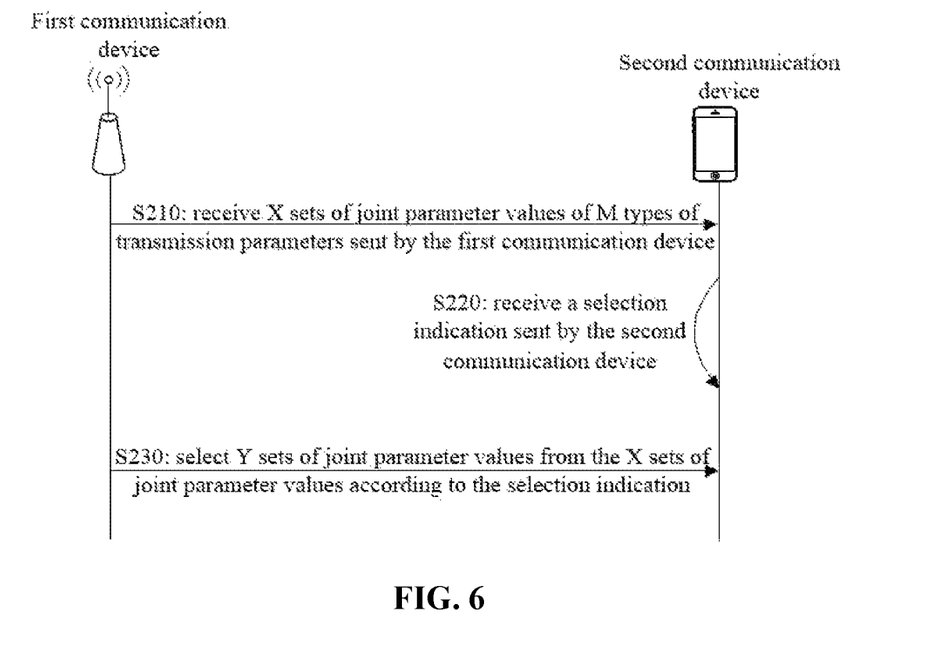
FIG. 6 is a schematic flowchart of a third information processing method according to an embodiment of the present disclosure.

As shown in FIG. 6, an embodiment of the present disclosure provides an information processing method which is applied to a second communication device. The method includes:

Step S210, X sets of parameter values jointly encoding M types of transmission parameters sent by the first communication device are received, where the M types of transmission parameters include a beam indication and/or a QCL indication parameter, where the beam indication is used for indicating the beam, the QCL indication parameter is used for indicating a parameter of the beam, and M>1.

Step S220, a selection indication sent by the first communication device is received.

Step S230, Y sets of parameter values are selected from the X sets of parameter values for the data transmission according to the selection indication, where X>=Y>=1.

In an exemplary embodiment, the method further includes:

Sending a resource location of a pilot signal to the first communication device, where the X sets of parameter values are parameter value sets to which the resource location corresponds.

The second communication device feeds back the resource location of the pilot signal detected by its own to the first communication device. According to the resource location of the pilot signal, the first communication device may learn which beams currently received by the second communication device have the optimum signal quality, thereby determining the parameter values according to the received resource location of the pilot signal.

In an exemplary embodiment, the method further includes:

sending an acknowledgment message to the first communication device after the selection indication is received.

In order to notify the first communication device that the second communication device has received the selection indication, the second communication device, after receiving the selection indication, sends the acknowledgment massage to the first communication device and notifies the first communication device that the second communication device has successfully received the response message.

In an exemplary embodiment, the M types of transmission parameters include a beam indication and/or a quasi-co-location (QCL) indication parameter, where the QCL parameter is used for indicating beam information. The M types of transmission parameters further include one or more types of the following transmission parameters: a multiple-input and multiple-output (MIMO) transmission parameter and a reference signal (RS) parameter.

Figure 7:
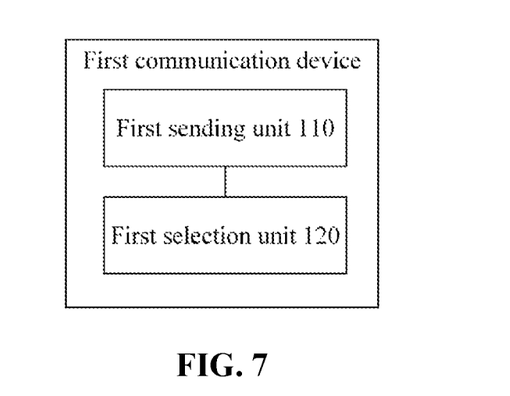
FIG. 7 is a schematic structural diagram of a first communication device according to an embodiment of the present disclosure.

As shown in FIG. 7, an embodiment of the present disclosure provides a communication device, which is a first communication device. The communication device includes:

a first sending unit 110 is configured to send X sets of parameter values jointly encoding M types of transmission parameters to a second communication device, where the beam indication is used for indicating the beam, the QCL indication parameter is used for indicating a parameter of the beam, and M>1;

a first selection unit 120 is configured to select Y sets of parameter values from the X sets of parameter values, where X>=Y>=1.

The first sending unit 110 is further configured to send a selection indication to the second communication device based on the Y sets of parameter values, where the selection indication is used for selecting the Y sets of parameter values by the second communication device from the X sets of parameter values for the data transmission.

The first sending unit 110 in this embodiment may correspond to an antenna or an antenna array of a base station or other communication devices.

The first selection unit 120 may correspond to a processor. The processor may include: a central processing unit, a microprocessor, a digital signal processor, an application processor, a programmable gate array or an application specific integrated circuit.

A connection is established between the first sending unit 110 and the first selection unit 120. The Y sets of parameter values are selected from the X sets of parameter values via the execution of executable instructions such as a computer program.

In some embodiments, the communication device further includes:

A determining unit is configured to determine the X sets of parameter values to which the M types of transmission parameters correspond.

The determining unit may correspond to a processor or a processing circuit and generate or determine based on a generation policy the X sets of parameter value sets. The detailed description of the X sets parameter values herein may refer to the forgoing embodiments.

In some embodiments, the M types of transmission parameters further include one or more types of the following transmission parameters: a multiple-input and multiple-output (MIMO) transmission parameter and a reference signal (RS) parameter.

In an exemplary embodiment, the MIMO transmission parameter includes one or more types of the following transmission parameters:

a max layer number, which is used for indicating a maximum number of MIMO transmission data streams;

a codebook (CB) parameter, which is used for configuring the codebook;

a codebook subset (CSR), which is used for defining a codeword selected from the codebook;

an uplink resource block size, which is used for defining a size of the resource block of the uplink transmission; and a precoding resource bundling granularity, which is used for defining resource granularities using a same precoding.

In an exemplary embodiment, the RS parameter includes one or more types of the following transmission parameters:

a DMRS configuration parameter, which is used for indicating information related to the DMRS transmission;

a PTRS transmission indication, which is used for at least indicating whether to transmit the PTRS; and a TRS configuration parameter, which is used for indicating information related to the TRS transmission.

In another embodiment, the transmission parameters further includes one or more types of the following parameters:

a retransmission parameter, which is used for indicating information related to the data retransmission;

a resource allocation parameter, which is used for indicating resource allocation state information;

a bandwidth part (BWP) parameter, which is used for indicating information related to the bandwidth part; and a modulation and coding scheme (MCS) parameter, which is used for indicating the modulation and coding scheme.

In an exemplary embodiment, the determining unit is specifically configured to determine the X sets of parameter values to which a pilot resource location reported by the second communication device corresponds.

In yet other embodiments, the communication device further includes:

a first receiving unit, which is configured to receive an acknowledgment message sent by the second communication device based on the selection indication;

the first sending unit is configured to transmit the data to the second communication device according to the Y sets of parameter values after receiving the acknowledgment message.

The first receiving unit is further configured to send information to the second communication device, for example, send a returned acknowledgment message based on the selection indication.

The first sending unit is further configured to transmit and receive the data by using beams to which the beams of the second communication device correspond according to the Y sets of parameter values after the first receiving unit receives the acknowledgment message.

Figure 8:
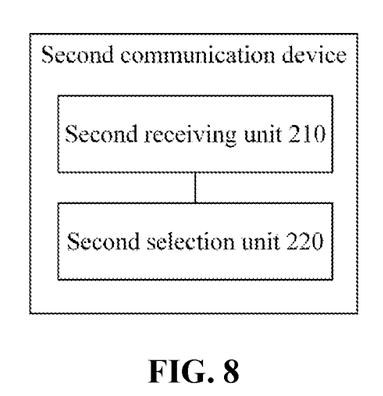
FIG. 8 is a schematic structural diagram of a second communication device according to an embodiment of the present disclosure.

As shown in FIG. 8, an embodiment of the present disclosure provides a communication device, which is a second communication device. The communication device includes:

a second receiving unit 210, which is configured to receive X sets of parameter values jointly encoding M types of transmission parameters and receive a selection indication sent by the first communication device, where the M types of transmission parameters include a beam indication and/or a quasi-co-location (QCL) indication parameter, where the beam indication is used for indicating the beam, the QCL indication parameter is used for indicating a parameter of the beam, and M>1;

a second selection unit 220, which is configured to select Y sets of parameter values from the X sets of parameter values for the data transmission according to the selection indication, where X>=Y>=1.

The second receiving unit 210 may include a receiving antenna and may be configured to receive the X sets of parameter values.

The second selection unit 220 is configured to select, according to the selection indication, Y sets of parameter values from the X sets of parameter values for the data transmission of the beam to be switched.

In some embodiments, the communication device further includes:

a second sending unit, which is configured to send a resource location of a pilot signal to the first communication device, where the X sets of parameter values are parameter value sets to which the resource location corresponds.

In this embodiment, the second sending unit transmits the data by using the selected Y sets of parameter values.

In an exemplary embodiment, the communication device further includes: a second sending unit which is configured to send an acknowledgment message to the first communication device after receiving the selection indication.

In yet other embodiments, the M types of transmission parameters further include one or more types of the following transmission parameters: a multiple-input and multiple-output (MIMO) transmission parameter and a reference signal (RS) parameter.

Figure 9:
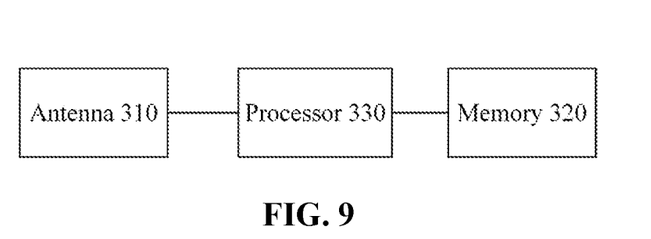
FIG. 9 is a schematic structural diagram of a communication device according to an embodiment of the present disclosure.

As shown in FIG. 9, an embodiment of the present disclosure provides a communication device. The communication device includes: an antenna 310, which is configured to receive and send a radio signal; a memory 320, which is configured to store information; and a processor 330 respectively connected to the antenna 310 and the memory 320, which is configured to implement the information processing method provided by one or more of technical solutions described above by executing a computer program stored in the memory.

The communication device provided by this embodiment may be the first communication device or the second communication device described above.

The antenna may include a sending antenna and a receiving antenna and the number of the sending antenna and the receiving antenna may be one or more.

The processor 330 respectively connected to an antenna 310 and the memory 320, which is configured to implement one more beam power controlling methods in the first communication device or one or more beam power controlling methods in the second communication device by executing the computer program 340.

The antenna in this embodiment may be one or more and may be configured to transmit and receive the radio signal, thereby implementing the information interaction between different communication devices.

The memory 320 may include a device storing various kinds of information.

The processor 330 may include: a central processing unit, a microprocessor, a digital signal processor, an application processor, a programmable gate array or an application specific integrated circuit. The processor 330 implements the beam power controlling method in the first communication device via the execution of the computer-executable instructions such as computer programs.

The processor 330 may be connected to the transceiver 310 and the memory 320 via a communication bus (for example, an integrated circuit bus).

An embodiment of the present disclosure provides a computer storage medium, which is configured to store a computer program for implementing, after the computer program is executed, the information processing method applied to the forgoing first communication device or second communication device provided by one or more of technical solutions.

The computer storage medium may be a portable storage device, read only memory (ROM), random access memory (RAM), magnetic disk, optical disk or another medium that can store program codes, and the computer storage medium may be a non-transitory storage medium or a non-volatile storage medium.

Several specific examples are provided below in conjunction with any of the above embodiments:

Based on the above analysis, the transmission parameters need to be changed when the beam switching occurs, and the transmission parameters cannot better cooperate with the beam switching by using a higher signaling reconfiguration mechanism, an embodiment of the present disclosure provides a method for dynamically determining the transmission parameter sets based on the beam in view of the enhance flexibility. The method includes:

Step 1 of the sending end: M types of transmission parameters are determined, where M is an integer greater than 1.

The M types of transmission parameters at least include a beam indication and/or a QCL indication parameter.

The M types of transmission parameters further include one or more types of the following parameters:

(a) MIMO transmission related parameters: a max layer number, a CSR, a CB parameter, an uplink resource block size (UL SB size), and a precoding resource bundling granularity (Bundling size);

(b) RS related parameters: a DMRS configuration parameter, a PTRS transmission indication (for example, a parameter indicating to transmit the PTRS (PTRS ON), or a parameter indicating not to transmit the PTRS (PTRS OFF)), and a TRS configuration parameter; and (c) other parameters: an HARQ parameter (CBG), an RA parameter (resource types), a BWP parameter and an MCS table.

Step 2 of the sending end: X sets of parameter values to which the M types of transmission parameters correspond are determined, where X>=1.

Step 3 of the sending end: parameter value sets jointly encoding M types of transmission parameters are configured to a receiving end.

Step 4 of the sending end: Y sets of parameter values are selected from the X sets of parameter values, where X>=Y>=1, and the indication signaling is sent to the receiving end.

Step 5 of the sending end: the data is transmitted according to the Y sets of parameter values of the transmission parameters.

Correspondingly, the method at the receiving end includes steps described below:

Step 1 of the receiving end: transmission parameter configuration signaling is received, and the X sets of parameter values to which the M types of transmission parameters correspond are determined based on the transmission parameter configuration signaling, where M and X are an integer, M>1 and X>=1.

The M types of transmission parameters at least include: a beam indication and/or a QCL indication parameter, and further include an MIMO parameter or an RS parameter.

Step 2 of the receiving end: transmission parameter configuration set selection signaling is received, and Y sets of parameter values are selected from the X sets of parameter values of the transmission parameters based on the selection signaling, where X>=Y>=1;

Step 3 of the receiving end: the data is transmitted according to the Y sets of parameter values of the transmission parameters, where the data transmission includes the sending and reception of the data.

Figure 10:
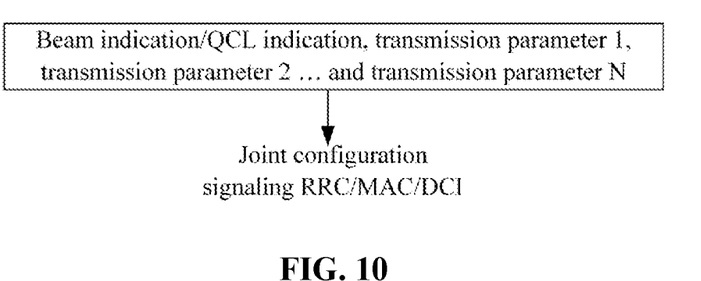
FIG. 10 is a schematic diagram of the transmission of a parameter value set according to an embodiment of the present disclosure.

As shown in FIG. 10, in this embodiment, the X sets of parameter values may be transmitted via joint configuration signaling, where the joint configuration signaling may be one or more signalings, or one or more joint configuration signalings. For example, the joint configuration signalings may be an RRC signaling, an MAC signaling and/or a DCI signaling. In FIG. 10, apart from the beam indication/QCL parameter, the transmission parameters further include other parameters, such as a transmission parameter 1, a transmission parameter 2 . . . , a transmission parameter N.

The transmission parameters are extended via the above method, which implements the dynamitic switching of the transmission parameter dedicated for the beam or related to the beam. The implementation method is to jointly configure the QCL parameter and the above other parameters to form parameter value states of multiple transmission parameters, as shown in Table 1.

TABLE 1

| Index of parameter value of the transmission parameter | Beam/QCL indication | DMRS | | | |
|---|---|---|---|---|---|
| | | Type | Number of OFDM symbols | Port subset | Sequence scrambling |
| 0 | CSI-RS1 | Type 1 | 2 | Subset 1 | Scrambling a |
| 1 | CSI-RS2 | Type 2 | 1 | Subset 2 | Scrambling b |
| 2 | SS block1 | Type 1 | 2 | Subset 1 | Scrambling c |
| 3 | SS block2 | Type 1 | 2 | Subset 3 | Scrambling d |

The DMRS configuration parameter includes: the type of the DMRS, the number of symbols of the transmission symbol used by the DMRS transmission, the port subset for sending the DMRS, and the scrambling for scrambling the DMRS transmission. The transmission symbol may be one or more orthogonal frequency division multiplexing (OFDM) technologies. In addition to the combination with the DMRS, the QCL may be jointly configured with the PTRS and the TRS, as shown in Table 2.

TABLE 2

| Index of parameter value of the transmission parameter | Beam/QCL indication | PTRS | TRS |
|---|---|---|---|
| 0 | CSI-RS1 | ON | Configuration 1 |
| 1 | CSI-RS2 | ON | Configuration 1 |
| 2 | SS block1 | OFF | Configuration 2 |
| 3 | SS block2 | ON | Configuration 3 |

| Index of parameter value of the transmission | Beam/QCL | Max layer | Precoding resource bundling granularity set |
|---|---|---|---|

TABLE 2-continued

| parameter | indication | Number | (Bundling size set) |
|---|---|---|---|
| 0 | Channel state information reference signal (CSI-RS) | 2 | [2, 4] |
| 1 | CSI-RS2 | 2 | [1, 2] |
| 2 | Synchronizing signal (SS) block 1 | 4 | [4, RA] |
| 3 | SS block2 | 4 | [2, RA] |

| Index of parameter value of the transmission parameter | QCL | Uplink codebook configuration parameter | Sub-band size |
|---|---|---|---|
| 0 | Sounding reference signal (SRS) 1 | CSR1/CB1 | 4 |
| 1 | SRS2 | CSR2/CB2 | 4 |
| 2 | SRS3 | CSR3/CB3 | 2 |
| 3 | SRS4 | CSR4/CB4 | 8 |

The index of parameter value of the transmission parameters is dynamically selected and multiple transmission parameters are switched via the physical layer signaling.

Apart from the above applications, the beam/QCL indication and other parameters related to the transmission may also be jointly indicated, as shown in Tables 3 to 6.

TABLE 3

| Index of the parameter value of the transmission parameter | Beam/QCL indication | Number of CBGs |
|---|---|---|
| 0 | CSI-RS1 | 1 |
| 1 | CSI-RS2 | 1 |
| 2 | SS block3 | 2 |
| 3 | SS block4 | 4 |

TABLE 4

| Index of the parameter value of the transmission parameter | Beam/QCL indication | Resource allocation type |
|---|---|---|
| 0 | SS block1 | Type 1 |
| 1 | SS block2 | Type 1 |
| 2 | SS block3 | Type 2 |
| 3 | SS block4 | Type 2 |

TABLE 5

| Index of the parameter value of the transmission parameter | Beam/QCL indication | BWP configuration |
|---|---|---|
| 0 | SS block1 | Partitioning method 1 |
| 1 | SS block2 | Partitioning method 1 |
| 2 | SS block3 | Partitioning method 2 |
| 3 | SS block4 | Partitioning method 2 |

TABLE 6

| Index of the parameter value of the transmission parameter | Beam/QCL indication | MCA table |
|---|---|---|
| 0 | SS block1 | MCA table 1 |
| 1 | SS block2 | MCA table 2 |
| 2 | SS block3 | MCA table 3 |
| 3 | SS block4 | MCA table 4 |

The joint configuration is also shown in Table 7.

TABLE 7

| Index of the parameter value of the transmission parameter | Beam/QCL indication | DCI format to be detected |
|---|---|---|
| 0 | SS block1 | DCI format set 1 |
| 1 | SS block2 | DCI format set 2 |
| 2 | SS block3 | DCI format set 3 |
| 3 | SS block4 | DCI format set 4 |

When the beam is recovered, parameter value (TC) sets of the transmission parameters are configured for the corresponding potential selected beams. Since a correspondence exists between the resource location reported by the terminal and the parameter values of the transmission parameters, the potential selected beams needs to be configured by a base station with corresponding parameter value sets of the transmission parameters. For example, when the disconnected terminal and base station reconnect, the beam recovery of both parties occurs.

It is to be understood that the device and the method disclosed in embodiments of the present disclosure may be implemented in other ways. The device embodiments described above are merely exemplary. For example, the unit division is merely a logical function division, and, in practice, the unit division may be implemented in other ways. For example, multiple units or components may be combined or may be integrated into another system, or some features may be omitted or not executed. Additionally, coupling, direct coupling or communication connection between the presented or discussed components may be indirect coupling or communication connection, via interfaces, between devices or units, and may be electrical, mechanical or in other forms.

The units described above as separate components may or may not be physically separated. Components presented as units may or may not be physical units, that is, may be located in one place or may be distributed over multiple network units. Part or all of these units may be selected according to actual requirements to achieve objects of solutions of embodiments of the present disclosure.

Moreover, various function units in embodiments of the present disclosure may all be integrated in one processing module, or each unit may be used as a separate unit, or two or more units may be integrated into one unit. The integrated function unit may be implemented by hardware or may be implemented by hardware plus a software function unit.

It may be understood by those skilled in the art that all or part of the steps in the method embodiments described above may be implemented by hardware related to program instructions, these programs may be stored in a computer-readable storage medium, and, when executed, these programs execute steps included in the method embodiments described above; and the preceding storage media includes various media capable of storing program codes, such as a removable storage device, a read-only memory (ROM), a random access memory (RAM), a magnetic disk or an optical disk.

The above are only specific embodiments of the present disclosure and are not intended to limit the present disclosure. It is easy for those skilled in the art to conceive modifications or substitutions within the technical scope of the present disclosure. These modifications or substitutions are within the scope of the present disclosure. Therefore, the protection scope of the present disclosure is subject to the protection scope of the claims.

INDUSTRIAL APPLICABILITY

As described above, an information processing method, a communication device and a storage medium provided by the present disclosure have the following beneficial effect: the corresponding switching of the transmission parameter based on the beam switching is implemented, thereby ensuring the data transmission between the two parties.

What is claimed is:

1. A method for wireless communication, comprising:
   transmitting, from a base station to a terminal, a Radio Resource Control (RRC) message that includes X sets of parameter values comprising at least two types of transmission parameters, wherein the at least two types of transmission parameters comprise a quasi-co-location (QCL) parameter and a beam indication associated with the QCL parameter, the beam indication indicating a channel state information reference signal or a synchronization signal block, wherein the X sets of parameter values are associated with Demodulation Reference Signal (DMRS) configuration information specifying a DMRS type of type 1 or type 2 that is related to resource allocation, whether a number of symbols used by a DMRS transmission is 1 or 2, a DMRS scrambling identity for scrambling the DMRS transmission, and jointly configured Phase Tracking Reference Signal (PTRS) configuration information comprising a parameter indicating whether a PTRS transmitted from the base station to the terminal is present or not;
   selecting, by the base station, Y sets of parameter values from the X sets of parameter values included in the RRC message, wherein X≥Y≥1; and
   transmitting, from the base station to the terminal, a Downlink Control Information message that includes a selection indication indicating a set of parameter values in the Y sets of parameter values selected from the X sets of parameter values included in the RRC message for a data transmission.

2. The method of claim 1, wherein the at least two types of transmission parameters further comprise a bandwidth part (BWP) parameter.

3. A method for wireless communication, comprising:
   receiving, by a terminal from a base station, a Radio Resource Control (RRC) message that includes X sets of parameter values comprising at least two types of transmission parameters, wherein the at least two types of transmission parameters comprise a quasi-co-location (QCL) parameter and a beam indication associated with the QCL parameter, the beam indication indicating a channel state information reference signal or a synchronization signal block, wherein the X sets of parameter values are associated with Demodulation Reference Signal (DMRS) configuration information specifying a DMRS type of type 1 or type 2 that is related to resource allocation, whether a number of symbols used by a DMRS transmission is 1 or 2, a DMRS scrambling identity for scrambling the DMRS transmission, and jointly configured Phase Tracking Reference Signal (PTRS) configuration information comprising a parameter indicating whether a PTRS transmitted from the base station to the terminal is present or not;

receiving, by the terminal from the base station, a Downlink Control Information (DCI) message that includes a selection indication indicating a set of parameter values in Y sets of parameter values for a data transmission, wherein the Y sets of parameter values are selected from the X sets of parameter values included in the RRC message and wherein X≥Y≥1; and performing, by the terminal, the data transmission according to the selection indication.

4. The method of claim 3, wherein the at least two types of transmission parameters further include a bandwidth part (BWP) parameter.

5. A communication device, comprising:

a processor, and a memory including processor executable code, wherein the processor executable code upon execution by the processor configures the processor to:

transmit, to a terminal, a Radio Resource Control (RRC) message that includes X sets of parameter values comprising at least two types of transmission parameters, wherein the at least two types of transmission parameters comprise a quasi-co-location (QCL) parameter and a beam indication associated with the QCL parameter, the beam indication indicating a channel state information reference signal or a synchronization signal block, wherein the X sets of parameter values are associated with Demodulation Reference Signal (DMRS) configuration information specifying a DMRS type of type 1 or type 2 that is related to resource allocation, whether a number of symbols used by a DMRS transmission is 1 or 2, a DMRS scrambling identity for scrambling the DMRS transmission, and jointly configured Phase Tracking Reference Signal (PTRS) configuration information comprising a parameter indicating whether a PTRS to the terminal is present or not;

select Y sets of parameter values from the X sets of parameter values included in the RRC message, wherein X≥Y≥1; and transmit, to the terminal, a Downlink Control Information message that includes a selection indication indicating a set of parameter values in the Y sets of parameter values selected from the X sets of parameter values included in the RRC message for a data transmission.

6. The communication device of claim 5, wherein the at least two types of transmission parameters further comprise a bandwidth part (BWP) parameter.

7. A communication device, comprising:

a processor, and a memory including processor executable code, wherein the processor executable code upon execution by the processor configures the processor to:

receive, from a base station, a Radio Resource Control (RRC) message that includes X sets of parameter values comprising at least two types of transmission parameters, wherein the at least two types of transmission parameters comprise a quasi-co-location (QCL) parameter and a beam indication associated with the QCL parameter, the beam indication indicating a channel state information reference signal or a synchronization signal block, wherein the X sets of parameter values are associated with Demodulation Reference Signal (DMRS) configuration information specifying a DMRS type of type 1 or type 2 that is related to resource allocation, whether a number of symbols used by a DMRS transmission is 1 or 2, a DMRS scrambling identity for scrambling the DMRS transmission, and jointly configured Phase Tracking Reference Signal (PTRS) configuration information comprising a parameter indicating whether a PTRS transmitted from the base station is present or not;

receive, from the base station, a Downlink Control Information (DCI) message that includes a selection indication indicating a set of parameter values in Y sets of parameter values for a data transmission, wherein the Y sets of parameter values are selected from the X sets of parameter values included in the RRC message and wherein X≥Y≥1; and perform a data transmission according to the selection indication.

8. The device of claim 7, wherein the at least two types of transmission parameters further include a bandwidth part (BWP) parameter.

9. A non-transitory storage medium having code stored thereon, the code upon execution by a processor, causing the processor to:

transmit, from a base station to a terminal, a Radio Resource Control (RRC) message that includes X sets of parameter values comprising at least two types of transmission parameters, wherein the at least two types of transmission parameters comprise a quasi-co-location (QCL) parameter and a beam indication associated with the QCL parameter, the beam indication indicating a channel state information reference signal or a synchronization signal block, wherein the X sets of parameter values are associated with Demodulation Reference Signal (DMRS) configuration information specifying a DMRS type of type 1 or type 2 that is related to resource allocation, whether a number of symbols used by a DMRS transmission is 1 or 2, a DMRS scrambling identity for scrambling the DMRS transmission, and jointly configured Phase Tracking Reference Signal (PTRS) configuration information comprising a parameter indicating whether a PTRS transmitted from the base station to the terminal is present or not;

select, by the base station, Y sets of parameter values from the X sets of parameter values included in the RRC message, wherein X≥Y≥1; and transmit, from the base station to the terminal, a Downlink Control Information message that includes a selection indication indicating a set of parameter values in the Y sets of parameter values selected from the X sets of parameter values included in the RRC message for a data transmission.

10. The non-transitory storage medium of claim 9, wherein the at least two types of transmission parameters further include a bandwidth part (BWP) parameter.

11. A non-transitory storage medium having code stored thereon, the code upon execution by a processor, causing the processor to:

receive, by a terminal from a base station, a Radio Resource Control (RRC) message that includes X sets of parameter values comprising at least two types of transmission parameters, wherein the at least two types of transmission parameters comprise a quasi-co-location (QCL) parameter and a beam indication associated with the QCL parameter, the beam indication indicating a channel state information reference signal or a synchronization signal block, wherein the X sets of parameter values are associated with Demodulation Reference Signal (DMRS) configuration information specifying a DMRS type of type 1 or type 2 that is related to resource allocation, whether a number of symbols used by a DMRS transmission is 1 or 2, a DMRS scrambling identity for scrambling the DMRS transmission, and jointly configured Phase Tracking Reference Signal (PTRS) configuration information comprising a parameter indicating whether a PTRS transmitted from the base station to the terminal is present or not;

receive, by the terminal from the base station, a Downlink Control Information (DCI) message that includes a selection indication indicating a set of parameter values in Y sets of parameter values for a data transmission, wherein the Y sets of parameter values are selected from the X sets of parameter values included in the RRC message and wherein $X \geq Y \geq 1$; and perform, by the terminal, the data transmission according to the selection indication.

12. The non-transitory storage medium of claim 11, wherein the at least two types of transmission parameters further include a bandwidth part (BWP) parameter.

* * * * *